Sept. 18, 1923.

A. F. CARLIN 1,468,617

FAN OPERATING MEANS

Filed Sept. 27, 1922  2 Sheets-Sheet 1

Inventor
A. F. Carlin.
By his Attorney

Sept. 18, 1923.
A. F. CARLIN
1,468,617
FAN OPERATING MEANS
Filed Sept. 27, 1922    2 Sheets-Sheet 2
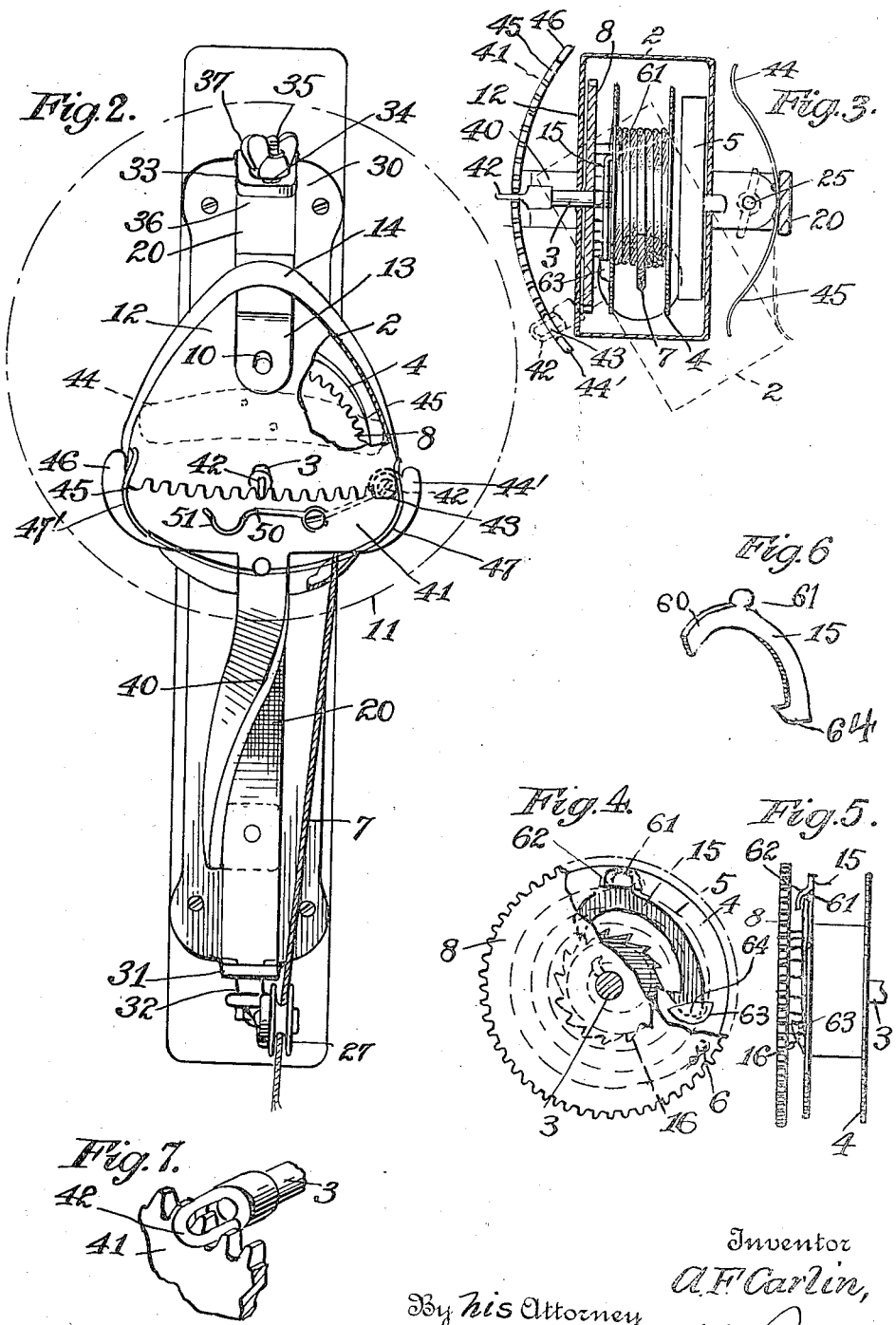
Inventor
A. F. Carlin,
By his Attorney
Wm H. Reid.

Patented Sept. 18, 1923.

1,468,617

UNITED STATES PATENT OFFICE.

ARVID F. CARLIN, OF MAMARONECK, NEW YORK.

FAN-OPERATING MEANS.

Application filed September 27, 1922. Serial No. 590,994.

*To all whom it may concern:*

Be it known that I, ARVID F. CARLIN, a citizen of the United States, and a resident of Mamaroneck, in the county of Westchester and State of New York, have invented certain new and useful Improvements in Fan-Operating Means, of which the following is a specification.

This invention has reference to means for operating a fan that will be actuated by pulling on a cord which can extend some distance from the device.

The object of the invention is to provide an improved device of this character that will produce the rapid rotation of a fan by merely pulling on a cord or cable, and which is assisted by a spring that is wound up when the cord is pulled and will serve to rewind the cord when released, and the fan will continue to rotate through the rewinding.

A further object is to provide means to cause the fan while rotating to swing through an arc back and forth, and which will turn in one direction when the cord is pulled, and in the opposite direction when the cord is rewound by the spring.

In the accompanying drawing showing embodiments of my invention Figure 1, is a side elevation partly in section, Fig. 2, is a front elevation partly in section.

Fig. 3 is a horizontal section on the line 6—6 of Fig. 1.
Figs. 4 and 5 show detector of the pawl and ratchet wheel.

Fig. 6 shows separately the pawl.

Fig. 7 shows in detail the loop and gear.

Figure 1:
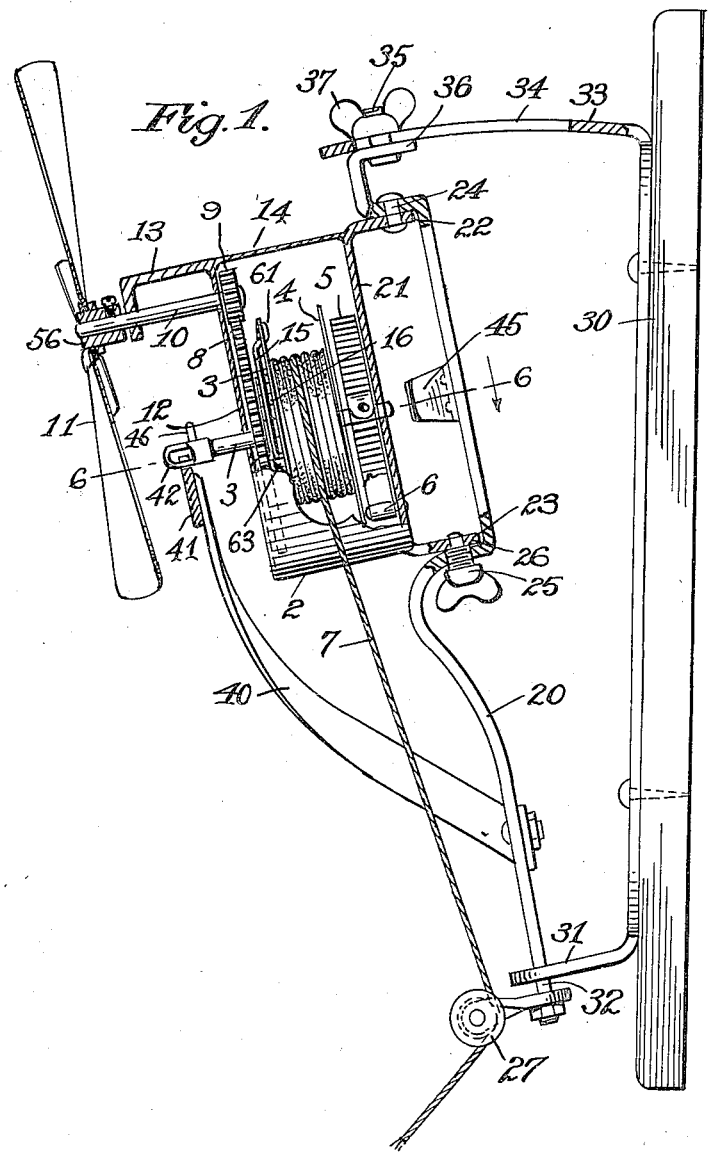

Most of the mechanism is mounted in a casing 2 in which rotates the main shaft 3 projecting from the front of the casing and this shaft in the casing carries the reel 4 fast thereto. A coil spring 5 has one end fast to the shaft 3, and the other end secured to a pin 6 on the casing and a cord or cable 7 passes in through the opening in the bottom of the casing and is secured to the reel and wound around the reel, so that when the cord is pulled and unwound to turn the reel in one direction, it will rotate the shaft 3 and wind up the coil spring. When the cord is released the spring will unwind and again wind up the cord by rotating the reel and shaft 3.
On the shaft 3 is loosely mounted a gear wheel 8, that engages a pinion 9 fast on a spindle 10 at the upper part of the casing, and to which spindle is secured the fan 11. This shaft 10 rotates in the front plate 12 of the casing and is also supported by a bent arm 13 that extends out from the cylindrical shell 14 of the casing.

Means are further provided to connect the gear 8 with the shaft or with the drum 4 on this shaft. This is in the form of a pawl and ratchet wheel, mounted respectively on these two members. As shown in Fig. 4 the pawl 15 is pivoted on the reel 4, which engages the ratchet wheel 16 fast to the gear 8. These two members are so arranged that when the reel rotates in one direction by pulling on the cord, the ratchet wheel will engage the pawl and cause rotation of the gear 8; which latter through the pinion 9 will rotate the fan shaft 10 at an increased speed. But when the cord is released and the coil spring now under tension will rotate the reel in the opposite direction, the ratchet wheel will engage the pawl to turn the gear in this direction. When the cord rotates the fan shaft rapidly the fan will acquire a suitable momentum by this high speed, and this reversed movement of the ratchet wheel, will permit the gear turning in the opposite direction free to be rotated by the fan. The cord will be rapidly wound up by the coil spring since very little energy is required during which time the fan will continue to run, then the cord is again pulled out and the ratchet wheel will again engage the pawl and gear to give a fresh impulse. By this means the rotating of the fan shaft is practically continuous.

The casing 2 as shown is movable on a support 20 in the form of a bent arm. The rear wall 2 of the casing has apertured ears 22 and 23 at the top and bottom, and the ear 22 is pivoted by a rivet 24 in the bent portion 28 of the arm. The lower ear 23 is pivoted by set screw 25 on a bent portion 26 of the support 20, that is in alinement with the pivot 25 and permits the casing to swing on these pivots in a lateral direction. But when the said screw 25 is tightened the casing is locked against swinging and made fast on the arm 20. At the lower end of the arm 20 is a swinging guide pulley 27 for the cord.

The supporting arm 20 is shown as mounted to be adjusted to and from an upright position by means of a bracket 30, having apertured arm 31 on the bottom through which extends the lower reduced end 32 of the bracket support 20. At the upper end of the bracket 30 is an arm 33 having a long slot 34 to receive a bolt 35 carried by the upper bent end 36 of the support 20. A wing nut 37 on the bolt 35 serves to lock the upper end of the support 20 in adjusted positions. In Fig. 1, the casing and support are shown to incline but when the wing nut is loosened the casing can be moved in toward the bracket 30 to any position in the slotted arm 33 and then locked in such position by the wing nut.

Means are provided for swinging the casing on the support 20 that are connected with the main shaft 3. A bar 40 extends upward from the support 20, and carries a rack plate 41, that is engaged by a form of pinion or gear 42 on the end of shaft 3. This device is preferably in the form of a wire loop 42, see Fig. 5, that serves when the shaft 3 rotates, to engage its two parallel portions between the teeth of the rack 41, and this will operate to advance the loop and shaft along the stationary rack 41. It has been set forth that the shaft 3 turns in one direction when the cord is pulled and in the opposite direction when released and the spring winds up the cord. This will cause the shaft to move up in one direction along the rack when the cord is pulled and in the opposite direction when the shaft 3 is reversed. When this loop 2 reaches one end of the rack 41 it will be permitted to continue turning in the same direction because of a space at 43 between the last tooth and an extension 44' of the rack  At the other end of the rack is a similar space 45 adjacent an upright projection 46. It will be understood that shifting of the shaft 3 will move the casing 2 that carries the fan shaft, that is will swing on the pivots at 24, and 25. When the cord is pulled the rotation of the shaft 3 will turn the casing until the loop 42 reaches one end of the rack and the casing will not swing further, but the shaft 3 will continue to rotate as long as the cord is pulled. Release of the cord will cause the shaft 3 to rotate in the opposite direction by the coil spring unwinding and the loop 42 will now turn in the opposite direction and will travel across the rack and swing the casing and fan at the opposite end of the rack teeth, when it can continue to rotate. But it is desirable to provide means tending to start a loop 2 in the reverse direction, when it reaches each end portion of the rack bar. For this purpose I provide plate springs 44 and 45 on the support 20 at the rear of the casing, see Fig. 3. These will be placed in tension as the casing is turned, and when the shaft 3 is reversed will tend to move the shaft in the opposite direction of travel and start the loop 42 in engagement with the end ratchet teeth. Similar springs 47 and 47' are provided on the rack bar 41, that will directly engage the shaft 3 for the same purpose.

I further provide a swinging arm 50 on the lock bar 41, that has its bent end 51 arranged to be brought at the upper part of the end portion 43 where the loop 42 rotates free. This will prevent the spring causing the loop to move back to engage ratchet teeth, and the loop will rotate in both directions at this place and cannot be moved by the spring.

It will be seen from Figs. 4, 5 and 6, that the pawl 15 is in the form of a double pawl provided with an arm 60. This pawl has an ear 61 that projects under a bent ear 62 of the reel 4. The arm 15 of the pawl rides under a bent ear 63 on the reel 4, that extends over this projecting end 64. The arm 60, or the arm 15 will fall into the ratchet wheel 16 by gravity and cause the ratchet wheel to turn the gear 8, when the string is pulled. But when the spring rotates the ratchet wheel 16 in the opposite direction it will force out the engaging pawl end and permit the gear 8 to rotate freely.

What I claim is:

1. Fan operating means comprising a support, a casing mounted to swing on the support, a shaft rotatable in the casing, a reel fast on the shaft, a coil spring connected between the reel and the casing, a cord on the reel, a gear rotatable on the shaft, a fan shaft driven by said gear, and a fan on said shaft, and means for causing the rotation of said shaft to swing the casing in opposite directions, and means for reversing the swing of the casing, and means for preventing operation of said latter means.

2. Fan operating means comprising a support, a casing mounted to swing on the support, a shaft rotatable in the casing, a reel fast on the shaft, a coil spring connected between the reel and the casing, a cord on the reel, a gear rotatable on the shaft, a fan shaft driven by said gear, a pawl and ratchet wheel connecting the reel and said gear, and means for causing the rotation of said shaft to swing the casing in opposite directions, comprising the loop on the shaft end and a rack bar carried by the support engaged by the loop to function as a pinion, and a stop arm at each end of the rack beyond the last tooth to permit the loop to continue to turn.

3. Fan operating means comprising a support, a casing mounted to swing on the support, a shaft rotatable in the casing, a reel fast on the shaft, a coil spring connected between the reel and the casing, a cord on the reel, a gear rotatable in the shaft, a fan shaft driven by said gear, a pawl and ratchet wheel connecting the reel and said gear, and means for causing the rotation of said shaft to swing the casing in opposite directions, comprising the loop on the shaft end and a rack bar carried by the support engaged by the loop to function as a pinion, a stop arm at each end of the rack beyond the last tooth to permit the loop to continue to turn, and a spring at each side of the casing to cause the loop to again engage the rack teeth on reversal of the shaft.

4. Fan operating means comprising a support, a casing mounted to swing on the support, a shaft rotatable in the casing, a reel fast on the shaft, a coil spring connected between the reel and the casing, a cord on the reel, a gear rotatable on the shaft, a fan shaft driven by said gear, a pawl and ratchet wheel connecting the reel and said gear, and means for causing the rotation of said shaft to swing the casing in opposite directions, comprising the loop on the shaft end and a rack bar carried by the support engaged by the loop to function as a pinion, a stop arm at each end of the rack beyond the last tooth to permit the loop to continue to turn, and a spring at each end of the rack to cause the loop to re-engage the rack teeth on the reversal of the shaft.

5. Fan operating means comprising a support, a casing mounted to swing on the support, a shaft rotatable in the casing, a reel fast on the shaft, a coil spring connected between the reel and the casing, a cord on the reel, a gear rotatable on the shaft, a fan shaft driven by said gear, a double gravity pawl on the reel, a ratchet wheel on the gear engaging said pawl, and means for causing the rotation of said shaft to swing the casing in opposite directions.

6. The combination with the ratchet wheel and the gear connected with the fan, of a double pawl having an ear, the reel having a bent part engaged by said pawl ear, the gear also having a bent ear engaging one end of the pawl.

7. Fan operating means comprising a support, a casing mounted to swing on the support, a shaft rotatable in the casing, a reel fast on the shaft, a cord on the reel arranged to turn the reel and shaft in one direction coil spring connected between the reel and casing that is tensioned by the reel and which will react to cause reversed rotation of the reel and shaft, and means for causing the reversed rotations of the reel and shaft to swing the casing in opposite directions.

8. Fan operating means comprising a support, a casing mounted to swing on the support, a shaft rotatable in the casing, a reel fast on the shaft, a cord on the reel arranged to turn the reel and shaft in one direction, a coil spring connected between the reel and casing that is tensioned by the reel and which will react to cause reversed rotation of the reel and shaft, means for causing the reversed rotations of the reel and shaft to swing the casing in opposite directions, and means for disabling said latter means.

9. The combination with the casing and the fan operating means therein, of the casing rear wall being provided with an apertured ear projecting rearward at the top and also at the bottom, a bracket comprising an upright plate with a short forward bent apertured arm at the bottom and a slotted arm at the top, an upright bar adjustably secured in said arms at its end portions, said bar having laterally bent apertured portions in which said ears of the casing are pivoted to swing the casing, an arm on said bar, and means connected with the fan operating means that engage said latter arm to oscillate the casing on the bracket.

Signed at New York, N. Y. on Sept. 16, 1922.

ARVID F. CARLIN.